(12) United States Patent
Farha

(10) Patent No.: US 10,497,909 B2
(45) Date of Patent: Dec. 3, 2019

(54) BATTERY ASSEMBLY WITH SNAP-IN ARRAYS

(71) Applicant: Ford Global Technologies LLC, Dearborn, MI (US)

(72) Inventor: Eid Farha, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1305 days.

(21) Appl. No.: 14/477,912

(22) Filed: Sep. 5, 2014

(65) Prior Publication Data

US 2016/0072107 A1    Mar. 10, 2016

(51) Int. Cl.
| | |
|---|---|
| *H01M 2/10* | (2006.01) |
| *B60L 11/12* | (2006.01) |
| *B60K 6/28* | (2007.10) |
| *B60L 11/18* | (2006.01) |
| *B60L 50/15* | (2019.01) |
| *B60L 50/60* | (2019.01) |
| *B60K 6/52* | (2007.10) |

(52) U.S. Cl.
CPC ............. *H01M 2/1077* (2013.01); *B60K 6/28* (2013.01); *B60L 50/15* (2019.02); *B60L 50/66* (2019.02); *B60K 6/52* (2013.01); *H01M 2220/20* (2013.01); *Y02T 10/6265* (2013.01); *Y02T 10/6269* (2013.01); *Y02T 10/7005* (2013.01); *Y02T 10/705* (2013.01); *Y02T 10/7077* (2013.01); *Y10S 903/907* (2013.01)

(58) Field of Classification Search
CPC .. B60K 6/28; B60K 6/52; B60L 11/12; B60L 11/1877; B60L 50/15; B60L 50/66; H01M 2220/20; H01M 2/1077; Y02T 10/6265; Y02T 10/6269; Y02T 10/7005; Y02T 10/705; Y02T 10/7077; Y10S 903/907

See application file for complete search history.

(56) References Cited

U.S. PATENT DOCUMENTS

| | | | |
|---|---|---|---|
| 3,320,095 A | 5/1967 | Bingeman et al. | |
| 5,998,060 A | 12/1999 | McGrady | |
| 7,381,093 B2 | 6/2008 | Shimamori et al. | |
| 8,968,912 B2 | 3/2015 | Maguire et al. | |
| 2008/0160395 A1* | 7/2008 | Okada | H01M 2/1083 429/99 |
| 2009/0142650 A1* | 6/2009 | Okada | H01M 2/1077 429/71 |
| 2013/0071705 A1 | 3/2013 | Frutschy et al. | |
| 2013/0260611 A1 | 10/2013 | Ahn | |

(Continued)

FOREIGN PATENT DOCUMENTS

CN    103178223 A    6/2013

OTHER PUBLICATIONS

Office Action for Chinese Application No. 201510557033.0, dated Feb. 1, 2019, 5 pages.

*Primary Examiner* — Lingwen R Zeng
(74) *Attorney, Agent, or Firm* — David Kelly; Brooks Kushman P.C.

(57) ABSTRACT

A traction battery assembly includes a tray and a pair of adjacent cell arrays disposed on the tray. Each array includes a plurality of stacked cells and a plurality of cell spacers interleaved with the cells. A portion of each of the spacers of one of the arrays is inserted into one of the spacers of the other of the arrays to form a plurality of end-to-end connected spacer pairs configured to secure the arrays together.

20 Claims, 3 Drawing Sheets

(56) References Cited

U.S. PATENT DOCUMENTS

2014/0045027 A1\* 2/2014 Suzuki ................ H01M 2/0207
429/99
2014/0356664 A1\* 12/2014 Jung ................... H01M 2/1077
429/82

\* cited by examiner

BATTERY ASSEMBLY WITH SNAP-IN ARRAYS

TECHNICAL FIELD

The present disclosure relates to traction battery assemblies for motor vehicles.

BACKGROUND

Vehicles such as battery-electric vehicles (BEVs), plug-in hybrid electric vehicles (PHEVs) and full hybrid-electric vehicles (FHEVs) contain a traction battery assembly to act as an energy source for the vehicle. The traction battery may include components and systems to assist in managing vehicle performance and operations. The traction battery may also include high voltage components.

SUMMARY

A traction battery assembly includes a tray and a pair of adjacent cell arrays disposed on the tray. Each array includes a plurality of stacked cells and a plurality of cell spacers interleaved with the cells. A portion of each of the spacers of one of the arrays is inserted into one of the spacers of the other of the arrays to form a plurality of end-to-end connected spacer pairs configured to secure the arrays together.

A battery assembly includes a first array of cells having first cell spacers interleaved with the cells. Each of the first spacers includes a male connection feature. The battery assembly further includes a second array of cells adjacent to the first array and having second cell spacers interleaved with the cells. Each of the second spacers includes a female connection feature that receives the male connection feature of a corresponding one of the first spacers to secure the arrays together.

A vehicle includes at least one electric machine configured to propel the vehicle and a traction battery assembly configured to power the at least one electric machine. The battery assembly includes a tray and a pair of adjacent cell arrays disposed on the tray. Each array has a plurality of stacked cells and a plurality of cell spacers interleaved with the cells. A portion of each of the spacers of one of the arrays is inserted into one of the spacers of the other of the arrays to form a plurality of end-to-end connected spacer pairs configured secure the arrays together.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
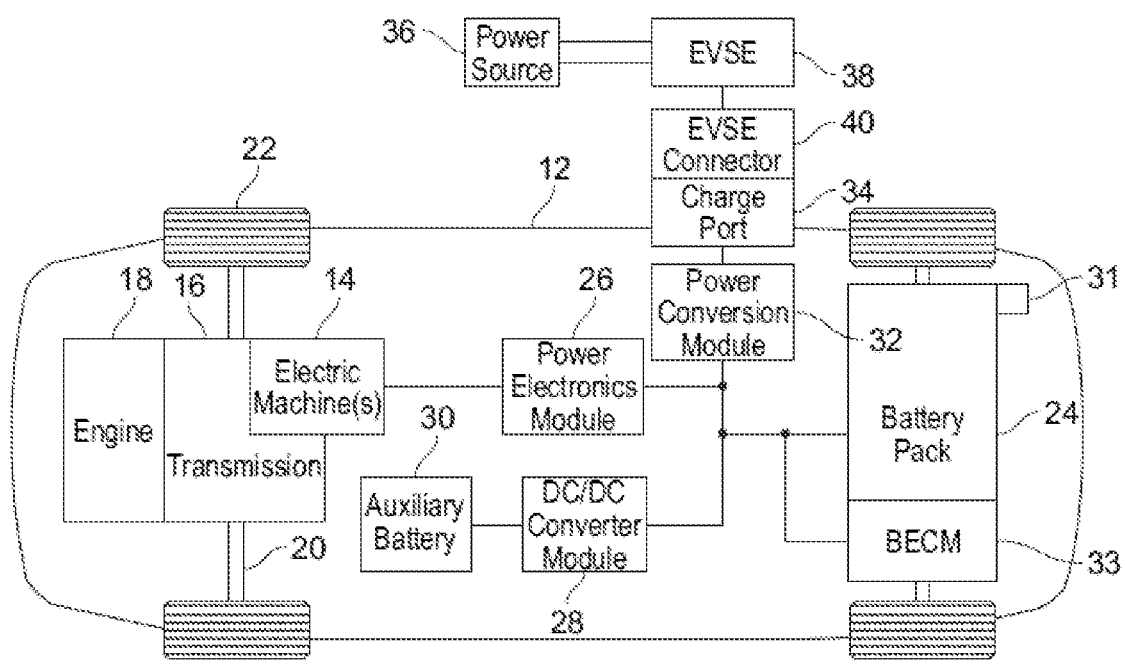
FIG. 1 depicts a schematic of a typical plug-in hybrid-electric vehicle.
Figure 2:
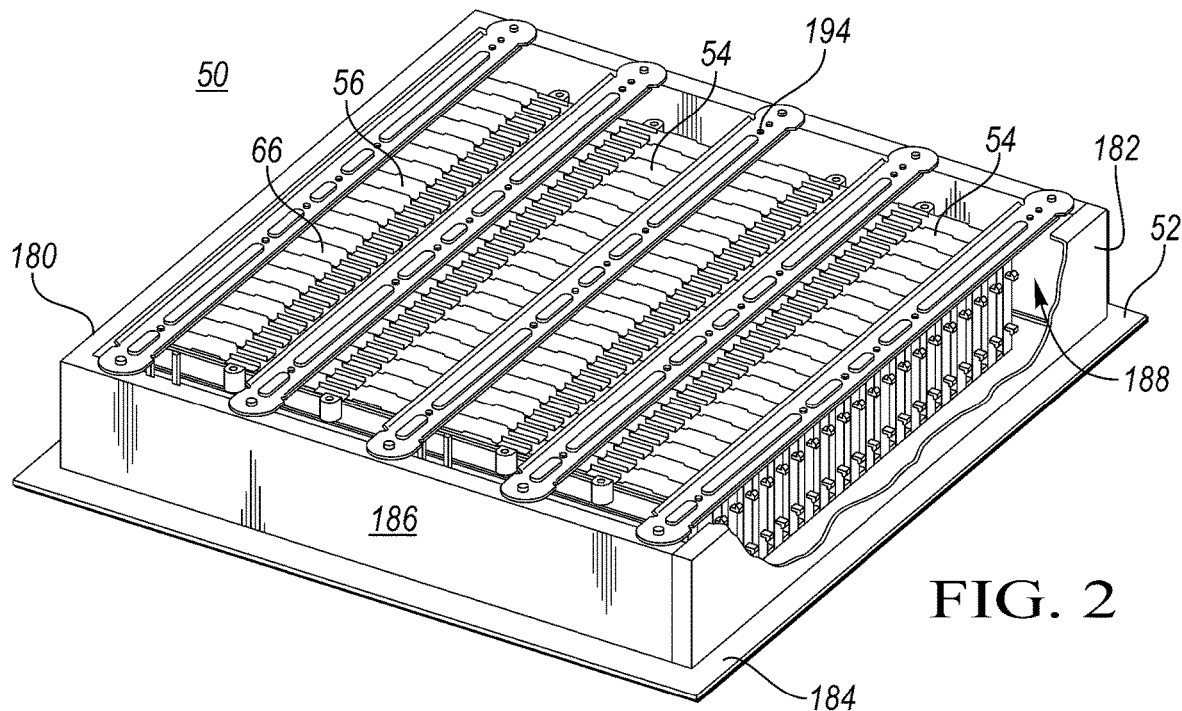
FIG. 2 illustrates a perspective view of a battery assembly.
Figure 3:
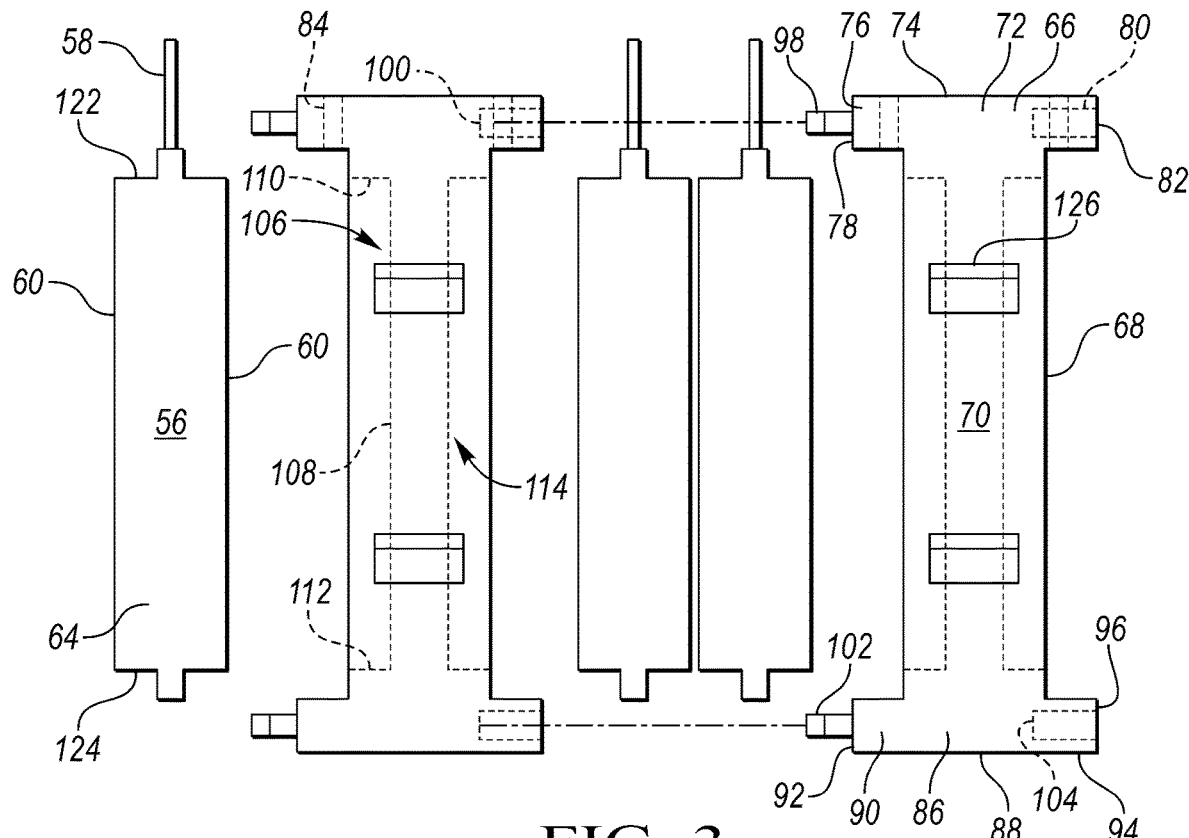
FIG. 3 illustrates an exploded side view of a portion of the battery assembly shown in FIG. 2.
Figure 4:
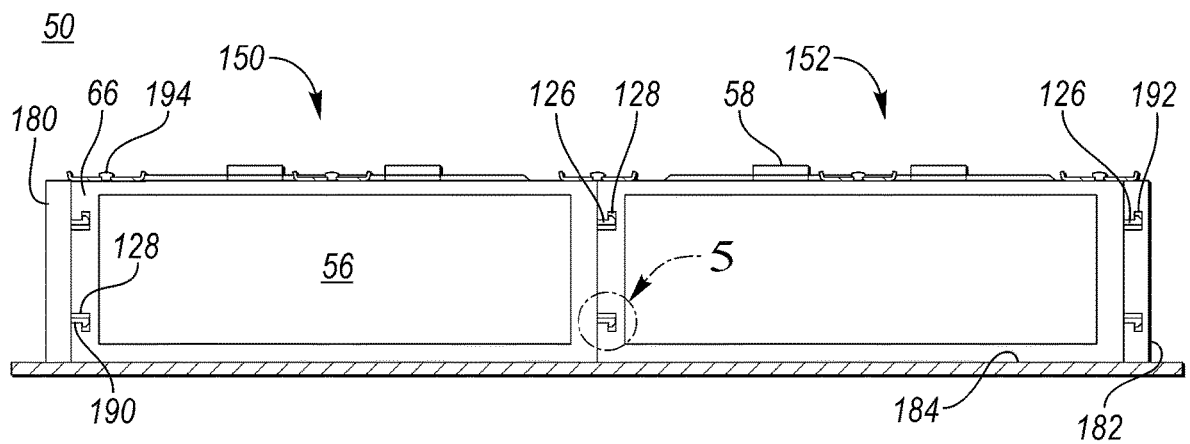
FIG. 4 illustrates a front view of the battery assembly shown in FIG. 1.
Figure 5:
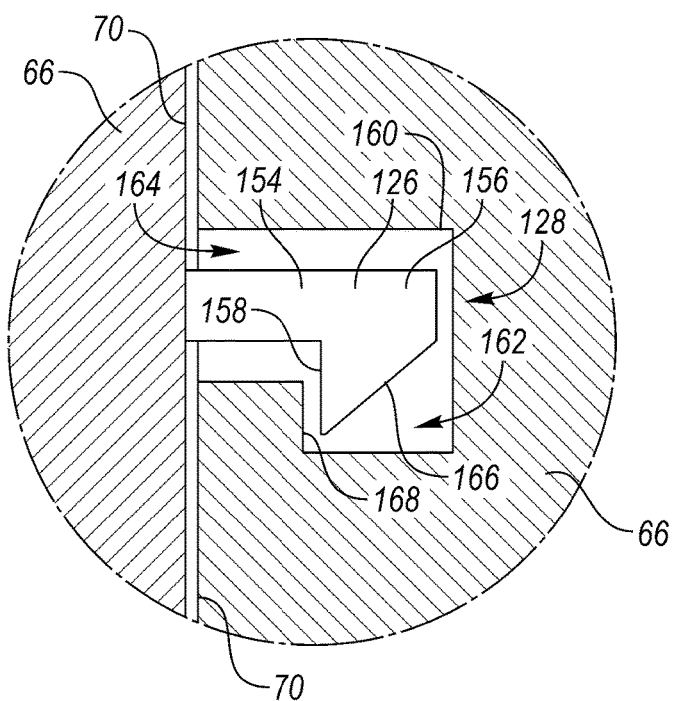
FIG. 5 is a detail view showing an exemplary connection between a pair of cell spacers.

FIG. 1 depicts a schematic of a typical plug-in hybrid-electric vehicle (PHEV). Certain embodiments, however, may also be implemented within the context of non-plug-in hybrids and fully electric vehicles. The vehicle 12 includes one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy through regenerative braking. The electric machines 14 reduce pollutant emissions and increase fuel economy by reducing the work load of the engine 18.

A traction battery or battery pack 24 stores energy that can be used by the electric machines 14. The traction battery 24 typically provides a high voltage direct current (DC) output from one or more battery cell arrays, sometimes referred to as battery cell stacks, within the traction battery 24. The battery cell arrays may include one or more battery cells.

The battery cells, such as a prismatic or pouch cell, may include electrochemical cells that convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another.

Different battery pack configurations may be available to address individual vehicle variables including packaging constraints and power requirements. The battery cells may be thermally regulated with a thermal management system. Examples of thermal management systems may include air cooling systems, liquid cooling systems and a combination of air and liquid systems.

The traction battery 24 may be electrically connected to one or more power electronics modules 26 through one or more contactors (not shown). The one or more contactors isolate the traction battery 24 from other components when opened and connect the traction battery 24 to other components when closed. The power electronics module 26 may be electrically connected to the electric machines 14 and may provide the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle. In a pure electric vehicle, the hybrid transmission 16 may be a gear box connected to an electric machine 14 and the engine 18 is not present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., a 12 volt battery).

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by an external power source 36. The external power source 36 is a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via dedicated electrical conduits.

FIGS. 2 through 5 and the related discussion, describe examples of the traction battery assembly 24. The traction battery assembly 50 includes a tray 52 that supports at least one battery array 54. For example, the tray 52 may support a pair of adjacent battery arrays 54. The at least one battery array 54 includes a plurality of stacked battery cells 56. Each cell 56 may be a pouch cell having at least one terminal 58 extending from at least one side of the cell 56. Alternatively, each cell may be a prismatic cell or a cylindrical cell. Each cell 56 may include opposing major sides 60 and opposing ends 64 that extended between the major sides 60. The cells 56 are stacked such that at least one of the major sides 60 of a cell is facing a major side of at least one other cell. The opposing ends 64 collectively define opposing longitudinal sides of the array 54. If there is more than one array, the arrays 54 may be positioned on the tray 52 with one of the longitudinal sides of one array adjacent to one of the longitudinal sides of another array.

Each of the arrays 54 may include a plurality of cell spacers 66 interleaved with the cells 56. Each array 54 may be arranged such that each cell 56 has a cell spacer 66 or may be arranged such that there is one cell spacer 66 for every two cells 56. Each cell spacer 66 may include opposing major sides 68 and opposing ends 70 that extend between the opposing major sides. Each spacer 66 may also include an upper portion 72 having a top surface 74, a front overhanging portion 76 and a rear overhanging portion 80. The overhanging portions 76, 94 extend beyond the major sides 68 generally forming a T-shaped when viewed from one of the ends. The front overhanging portion 76 may include a front contact surface 78 and the rear overhanging portion 80 may include a rear contact surface 82. The front contact surface 78 of one of the spacers engages with the rear contact surface 82 of an adjacent spacer 66 when the array 54 is assembled. Each of the front contact surfaces 78 may include at least one projection 98. Each of the rear contact surfaces 82 may include at least one receptacle 100 configured to receive a corresponding projection 98. The projection 98 and the receptacle 100 cooperate to snap adjacent spacers 66 together. The projection 98 may include barb-like features that cooperate with corresponding geometries in the receptacle 100 to prevent the projection 98 from pulling out of the receptacle 100. The projections may be removable from the receptacles upon application of sufficient force for serving the array.

Each spacer 66 may also include a lower portion 86 having a bottom surface 88, a front overhanging portion 90 and a rear overhanging portion 94. The front overhanging portion 90 may include a front contact surface 92 and the rear overhanging portion 94 may include a rear contact surface 96. The front contact surface 92 of one of the spacers 66 may engage with the rear contact surface 96 of an adjacent spacer 66 when the array 54 is assembled. Each of the front contact surfaces 92 may include at least one projection 102. Each of the rear contact surfaces 96 may include at least one receptacle 104 configured to receive a corresponding projection 102. The projection 102 and the receptacle 104 cooperate to snap adjacent spacers 66 together. The projection 102 may include barb-like features that cooperate with corresponding geometries in the receptacle 104 to prevent the projection 102 from pulling out of the receptacle 104.

Each spacer 66 may also include a front pocket 106 recessed into one of the major sides 68 and may include a rear pocket 114 recessed into the other major side 68. Each pocket may include an interior surface 108 and upper and lower surfaces 110, 112. The front and rear pockets 106 may each receive at least a portion of one of the cells 56 therein. The cells may be received such that one of the major sides 60 of the cell is disposed against the interior surface 108 and such that the top of the cell 122 is disposed against the upper surface 110 and the bottom of the cell 124 is disposed against the lower surface 112. The spacer 66 may also include terminal slots 84 that received the terminals 58 therethrough. The terminal slots 84 allow the terminals 58 to extend outside of the cell spacer 66 so that the terminals 58 may be electrically connected to each other. Each spacer 66 may also include at least one male connection feature 126 extending perpendicularly from one of the opposing ends 70. The other opposing end 70 may define at least one female connection feature 128. The male connection feature 126 may also be referred to as a projection. The female connection feature 128 may also be referred to as a receptacle. The specific type of attachment feature may vary depending on the cell type, cell material and other design considerations.

The traction battery assembly 50 may be assembled by first assembling the cells 56 and the spacers 66 into individual modular arrays 54. Each array 54 may then be attached to other arrays. The arrays 54 may be attached to each other via mating of the male and female connection features on each of the spacers 66. For example, the traction battery assembly 50 may include a first array 150 and a second array 152. Each of the male connection features 126 of the first array 150 may snap into one of the female connection features 128 of the second array 152 forming a plurality of end-to-end connected spacer pairs that are configured to secure the arrays together. The cells and spacers of each of the arrays 150, 152 may be arranged such that both of the arrays are identical.

For each spacer pair, the at least one male connection feature 126 may include a neck 154 and a head 156 disposed at a distal end of the neck. A proximal end of the neck 154 is connected to one of the opposing ends 70 of the spacer 66 and projects outwardly from the end 70 in a substantially perpendicular direction. The head 156 has a larger footprint than the neck 154 and includes a barb 158. The neck 154 and the head 156 may be integrally formed. The male connection feature 126 may be integrally formed with the spacer 66.

For each spacer pair, at least one female connection feature 128 may include a receptacle 160 recessed into one of the opposing ends 70 of the spacer 66. The receptacle 160 may include a main portion 162 and an entrance portion 164 that opens into the end 70 and provides a path for objects to be received within the main portion 162. When connected, the male connection feature 126 is received within the female connection feature 128 with the neck 154 mostly disposed within the entrance portion 164 and with the head 156 disposed in the main portion 162. The head 154 includes an angled surface 166 that aids the head in penetrating the entrance portion 164. The neck 154 may also have a certain amount of flexibility to allow the head 156 to deflect when penetrating the entrance portion 164. Once the head 156 is received within the main portion 162, the barb 158 cooperates with a latching wall 168 to prevent the male connection feature 126 from disengaging with the female connection feature 128. Both connection features they be designed with a certain amount of flexibility to allow the connection features to disengage each other when sufficient force is applied.

After the first and second arrays are connected to each other, the arrays 150, 152 may be connected to the tray 52. The arrays may be connected to the tray using similar male and female connection features as was described above. For example, the tray 52 may include a pair of opposing longitudinal sidewalls 180, 182 that extend upwardly from a tray base 184. The tray 52 may also include opposing front and rear walls 186 extending between the longitudinal sidewalls to define an open cavity 188 that surrounds the arrays. The longitudinal sidewall 180 may include a plurality of male connection feature 190 extending outwardly from an inside surface of the sidewall 180. The male connection features 190 are in registration with the female connection features 128 of the spacers 66 of the first array 150. Each male connection feature 190 engages with a corresponding female connection feature 128 to secure the arrays to the tray 52. The male connection feature 190 may be similar to the male connection feature 126 and may be attached to the female connection feature 128 similar to how the male connection feature 126 engages with the female connection feature 128.

The longitudinal sidewall 182 may include a plurality of female connection features 192 recessed into the longitudinal sidewall 182. The female connection features 192 are in registration with the male connection features 126 of the spacers of the second array 152. Each male connection feature 126 engages with the corresponding female connection feature 192 to secure the arrays to the tray 52. The female connection feature 192 may be similar to the female connection feature 128 and may engage with the male connection feature 126 similar to how the female connection feature 128 engages with the male connection feature 126. Additional straps 194 may be used to further secure the arrays to the tray 52. Each strap 194 may be connected between the front and rear walls 186. A lower surface of each strap is disposed against a top of the array to secure the arrays against the tray base 184.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A traction battery assembly comprising:
   a tray; and
   a pair of adjacent cell arrays disposed on the tray, each array including a plurality of stacked cells and a plurality of cell spacers interleaved with the cells, and a portion of each of the spacers of one of the arrays being inserted into one of the spacers of the other of the arrays to form a plurality of end-to-end connected spacer pairs configured to secure the arrays together.

2. The traction battery assembly of claim 1 wherein each of the spacers includes a projection or a receptacle, and wherein the projection one of the spacers is received within the receptacle of an adjacent one of the spacers.

3. The traction battery of claim 1 wherein the tray further includes at least one standing wall having a plurality of receptacles in registration with the spacer pairs and wherein each of the spacer pairs further includes at least one projection configured to be received within one of the plurality of receptacles to secure the arrays to the tray.

4. The traction battery of claim 1 wherein the tray further includes at least one standing wall having a plurality of projections in registration with the spacer pairs and wherein each of the spacer pairs further includes a receptacle configured to receive one of the plurality of projections to secure the arrays to the tray.

5. The traction battery of claim 1 wherein each of the cell spacers define opposing pockets that are each configured to receive at least a portion of one of the cells.

6. The traction battery of claim 1 Wherein each of the plurality of spacer pairs further includes a first cell spacer having a male connection feature and a second cell spacer having a female connection feature configured to receive the male connection feature therein.

7. A vehicle comprising:
at least one electric machine configured to propel the vehicle; and
a traction battery assembly configured to power the at least one electric machine, the battery assembly including a tray and a pair of adjacent cell arrays disposed on the tray, each of the arrays having a plurality of stacked cells and a plurality of cell spacers interleaved with the cells, and a portion of each of the spacers of one of the arrays being inserted into one of the spacers of the other of the arrays to form a plurality of end-to-end connected spacer pairs configured secure the arrays together.

8. The traction battery assembly of claim 7 wherein each of the spacers includes a projection or a receptacle and wherein the projection one of the spacers is received within the receptacle of an adjacent one of the spacers.

9. The traction battery of claim 7 wherein each of the plurality of spacer pairs further includes a first cell spacer having a male connection feature and a second cell spacer having a female connection feature configured to receive the male connection feature therein.

10. The traction battery of claim 7 wherein the tray further includes at least one standing wall having a plurality of receptacles in registration with the spacer pairs and wherein each of the spacer pairs further includes at least one projection configured to be received within one of the plurality of receptacles to secure the arrays to the tray.

11. The traction battery assembly of claim 1 wherein each of the spacers in each of the cell arrays includes opposing major sides each disposed against a major side of a corresponding one of the cells and opposing ends extending between the major sides, wherein the portion of each of the spacers of the one of the arrays is located on one of the opposing ends of the spacer and is inserted into one of the opposing ends of one of the spacers of the other of the arrays to form the end-to-end connected spacer pairs.

12. The traction battery assembly of claim 11 further comprising a projection extending from one of the opposing ends of one of the arrays and disposed in a receptacle defined in one of the opposing ends of one of the spacers of the other of the arrays.

13. The traction battery assembly of claim 12 wherein the projection includes a barb and the receptacle includes a latching wall, and the projection is received in the receptacle so that the barb engages with the latching wall to impede removal of the projection from the receptacle.

14. The traction battery assembly of claim 1 wherein, for each of the cell arrays, one of the cell spacers includes a projection that is received in a receptacle of an adjacent spacer of the same array.

15. The traction battery assembly of claim 14 wherein the projection extends in a longitudinal direction of the array.

16. The traction battery assembly of claim 1 wherein each of the spacers includes a pocket recessed into the spacer and having a lower surface that engages with a bottom of one of the cells, an upper surface that engages with a top of the one of the cells, and an interior surface that engages with a major side of the one of the cells, and wherein the top defines a terminal slot that receives a terminal of the one of the cells.

17. A traction battery assembly comprising:
a tray including a wall; and
adjacent cell arrays disposed on the tray, each including stacked cells and spacers interleaved with the cells, wherein one of the spacers of one of the arrays has a first projection inserted into one of the spacers of the other of the arrays to form an end-to-end connected spacer pair that secures the arrays together and has a second projection received in the wall.

18. The traction battery of claim 17 wherein each of the spacers includes opposing major sides facing the cells and opposing ends extending between the major sides and wherein the first projection extends from one the opposing ends of the one of the spacers and the second projection extends from the other of the opposing ends of the one of the spacers.

19. The traction battery of claim 17 wherein the one of the spacers of one of the arrays further has a. third projection received in a receptacle of an adjacent spacer in the one of the arrays, wherein the first and second projections extend in a lateral direction of the array and the third projection extends in a longitudinal direction of the array.

20. The traction battery of claim 17 wherein the one of the spacers of the other of the arrays defines a receptacle including a latching wall, and the first projection includes a barb that engages with the latching wall to impede removal of the first projection from the receptacle.

* * * * *